(12) United States Patent  (10) Patent No.: US 8,027,122 B2
Vanderheyden et al.  (45) Date of Patent: Sep. 27, 2011

(54) DUAL SIDED TAPE STORAGE DEVICE AND DUAL SIDED TAPE DRIVE

(75) Inventors: William J. Vanderheyden, Loveland, CO (US); Richard H. Dee, Boulder, CO (US); Peter R. Coburn, Lafayette, CO (US); William T. Veno, Thornton, CO (US)

(73) Assignee: Oracle America, Inc., Redwood City, CA (US)

( * ) Notice: Subject to any disclaimer, the term of this patent is extended or adjusted under 35 U.S.C. 154(b) by 886 days.

(21) Appl. No.: 11/949,898

(22) Filed: Dec. 4, 2007

(65) Prior Publication Data

US 2009/0141393 A1 Jun. 4, 2009

(51) Int. Cl.
*G11B 5/54* (2006.01)
(52) U.S. Cl. ....... 360/93; 360/96.51; 360/251; 360/132; 360/241.2
(58) Field of Classification Search ............. 360/93, 360/96.51, 251, 132, 241.2
See application file for complete search history.

(56) References Cited

U.S. PATENT DOCUMENTS

| 5,293,285 | A | * | 3/1994 | Leonhardt et al. | 360/95 |
| 5,760,994 | A | * | 6/1998 | Kimura | 360/85 |
| 6,154,342 | A | | 11/2000 | Vanderheyden et al. | |
| 6,297,927 | B1 | * | 10/2001 | Rudi | 360/95 |
| 6,580,578 | B1 | | 6/2003 | Tucker et al. | |
| 6,657,807 | B1 | * | 12/2003 | Ozue | 360/72.1 |
| 7,068,464 | B2 | | 6/2006 | Dee | |
| 7,173,794 | B2 | * | 2/2007 | Molstad et al. | 360/251 |
| 7,733,598 | B1 | * | 6/2010 | Willems et al. | 360/96.1 |

* cited by examiner

*Primary Examiner* — Jefferson Evans
(74) *Attorney, Agent, or Firm* — Brooks Kushman P.C.

(57) ABSTRACT

A data storage device is provided with a housing having an access opening, a pair of tape reels and dual sided data tape. The access opening is adjacent to a tape path for access of each tape side. A tape drive is provided with a pair of read/write heads, each having a first position to receive the tape, and a second position for engaging one side of the tape for performing a read/write function. A method is disclosed for reading and/or writing data with a data storage device by providing a housing having an access opening, a pair of tape reels, and dual sided tape. The data storage device is loaded to a tape drive having a pair of read/write heads that are actuated to engage the data tape sides. The tape is conveyed along the pair of read/write heads while a read/write function is performed.

20 Claims, 7 Drawing Sheets

DUAL SIDED TAPE STORAGE DEVICE AND DUAL SIDED TAPE DRIVE

BACKGROUND OF THE INVENTION

1. Field of the Invention

The invention relates to data storage devices and tape drives for dual sided tape.

2. Background Art

Data storage devices such as data storage tape cartridges, have been employed in the computer, audio, video, and related arts. Data storage tape devices are often employed for recording and storing large quantities of data, such as media, for subsequent access and use.

Magnetic tape continues to be a popular medium for recording and storing information. Magnetic tape storage systems hold vast quantities of data at a relatively low cost per bit stored. Magnetic tapes are easily manipulated by automated storage systems. Data may be added to information already stored on a magnetic tape. In addition, magnetic tapes may be erased and re-recorded. Finally, magnetic tape has a long shelf life under proper storage conditions.

Magnetic tape and tape storage systems may be made increasingly more efficient and cost-effective by increasing the data storage density. Alternatively, information density may be greatly increased by utilizing double-sided magnetic tape such as that disclosed in U.S. Pat. No. 7,068,464 B2, which issued to Dee on Jun. 27, 2006 and is incorporated in its entirety be reference herein.

The prior art has also provided a single reel storage device and an associated tape drive for reading both sides of data tape as disclosed in U.S. Pat. No. 6,580,578 B1, which issued on Jun. 17, 2003 to Tucker et al. and is incorporated in its entirety by reference herein.

Access time for tape drives is typically much longer than access time for disc drives or optical products. The time required to thread tape through guiding components can add significantly to load time. Also, the time required to wind hundreds of meters of tape from one reel to another causes time to data to take excessively long in some formats. Decreasing time to data makes tape drives more competitive with other technologies.

SUMMARY OF THE INVENTION

One embodiment according to the present invention discloses a data storage device with a housing defining a cartridge that is sized to cooperate with a tape drive. A first tape reel and a second tape reel are each mounted for rotation within the housing. A data tape has a first end mounted to the first tape reel and a second end mounted to the second tape reel; the data tape also has a first data tape side and a second data tape side. An access opening is formed in the housing adjacent to a tape path of the tape for access to the first data tape side by a first read/write head of the tape drive, and for access to the second data tape side by a second read/write head of the tape drive.

Another embodiment according to the present invention discloses a tape drive having a first read/write head and a second read/write head with a first position to receive a data storage device having dual sided tape. The first and second read/write heads have a second position for engaging opposed sides of the dual sided tape for performing a read and/or write function individually or concurrently.

Yet another embodiment according to the present invention discloses a method for reading and/or writing data with a data storage device by providing a data storage device with a housing having an access opening, and a pair of tape reels. Tape is provided with a pair of ends that are each mounted to one of the tape reels, and with a pair of tape sides. The tape has a tape path that exposes both data tape sides to the access opening. The data storage device is loaded to a tape drive having a pair of read/write heads. The pair of read/write heads are actuated to each engage one of the pair of data tape sides. The pair of tape reels are driven to convey the tape along the pair of read/write heads. A read or write function is performed with the tape in at least one of the pair of read/write heads.

The above embodiments, and other embodiments, features, advantages, and benefits of the invention are readily apparent from the following detailed description of embodiments of the invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Average time to data on a single reel cartridge is typically longer than average time to data for a dual reel tape cartridge. Additionally, time for loading of the tape cartridge is typically longer for a single reel cartridge that requires time to thread the tape through guiding components and on to a second tape reel within the tape drive. Additionally, tape drives that utilize a cartridge with one reel with dual sided tape require reversal of the tape upon the second reel in order to read the tape on the opposed side by the same read/write head. The shortcomings of the prior art are overcome by the following embodiments which employ dual reel tape cartridges and tape drives that have a pair of read/write heads, each dedicated to one side of the tape.

Figure 1:
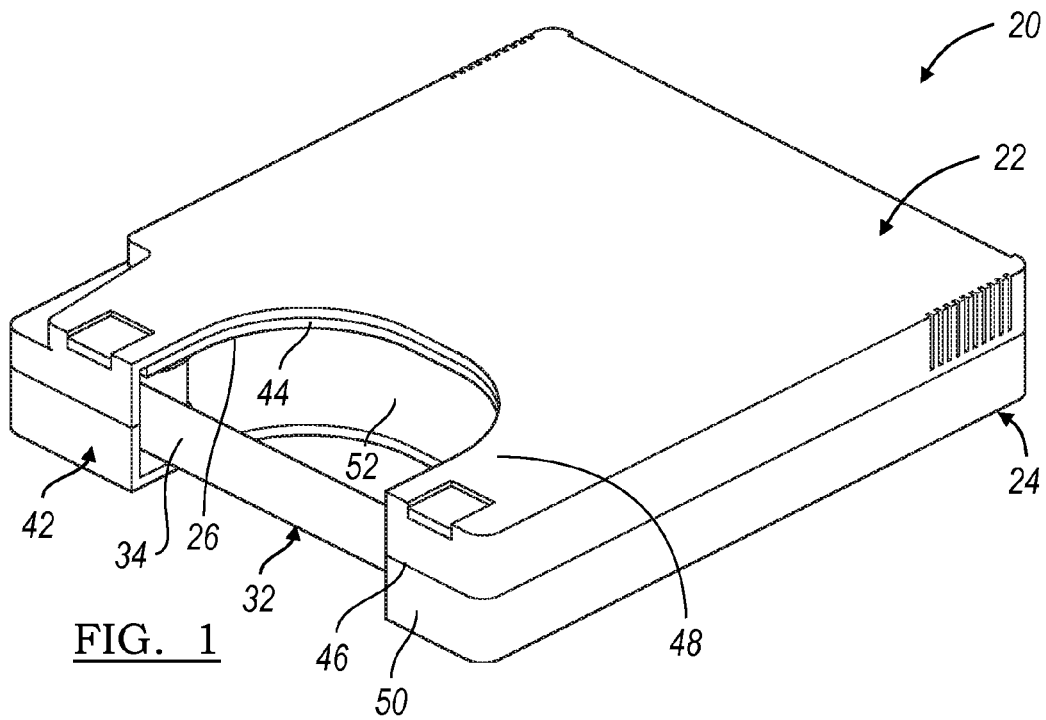
FIG. 1 is a perspective view of a tape cartridge according to an embodiment of the present invention.

With reference now to FIG. 1, a tape cartridge is illustrated according to at least one embodiment of the present invention and is referenced generally by numeral 20. The tape cartridge 20 is a dual reel tape cartridge such as that disclosed in U.S. Pat. No. 6,154,342, which issued to Vanderheyden et al. on Nov. 28, 2000 and is incorporated in its entirety by reference herein.

Figure 2:
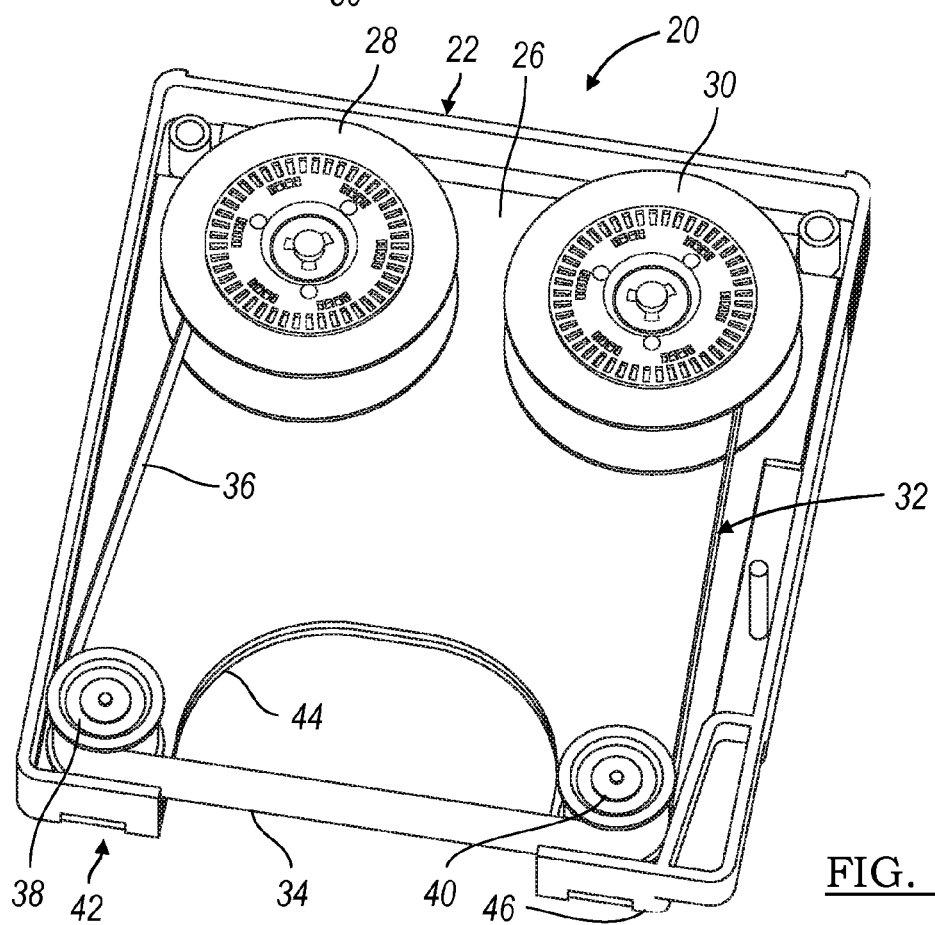
FIG. 2 is a bottom perspective view of the tape cartridge of FIG. 1, illustrated with a housing portion removed.
Figure 3:
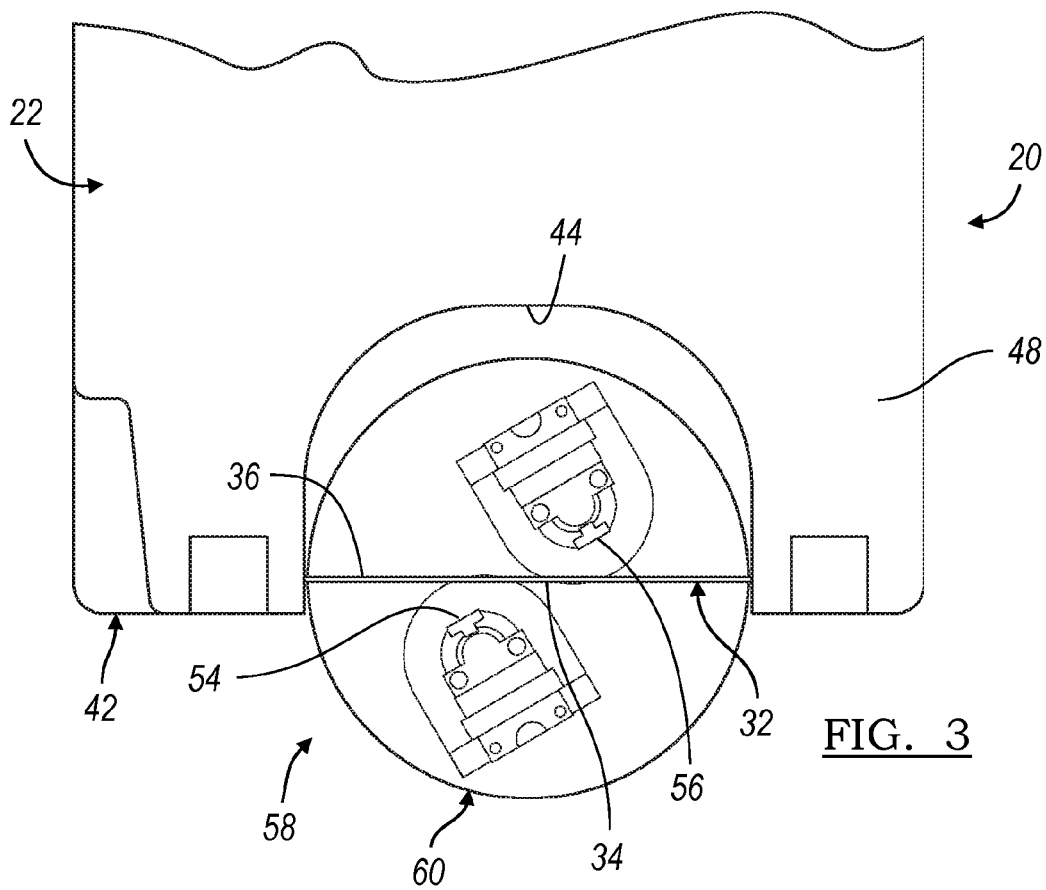
FIG. 3 is a top plan view of the tape cartridge of FIG. 1, and a portion of a tape drive, illustrated in a load position.

The tape cartridge 20 includes a housing provided by a pair of housing portions, for example, upper housing portion 22 and lower housing portion 24. In FIG. 2, the tape cartridge 20 is illustrated with the lower housing portion 24 removed thereby revealing internal components. A substrate 26 is provided within the cartridge 20 within a cavity provided between the upper and lower housing portions 22, 24. A pair of tape reels 28, 30 are each mounted to the substrate 26 for rotation relative to the substrate 26. A dual sided data tape 32 is mounted to and collectively spooled on the pair of tape reels 28, 30. The tape 32 has magnetic coatings on both sides of the tape 32, namely an outward side 34 and an inward side 36. The dual sided tape 32 permits data to be stored on both sides 34, 36 of the tape 32.

A pair of guide rollers 38, 40 are mounted on the substrate 26 for providing bearing support to the tape 32 and for extending a tape path along a peripheral region 42 of the cartridge 20. The tape reels 28, 30 and guide rollers 38, 40 are mounted to the substrate 26 to accurately locate the tape path. An access opening 44 is formed through the peripheral region 42 for providing access to the tape 32. In at least one embodiment, the access opening 44 is relatively large in comparison to that of prior art cartridges and is formed through a peripheral side wall 46 and a top plate 48 of the upper housing portion 22, as well as a peripheral side wall 50 and a bottom plate 52 of the lower housing portion 24.

The enlarged access opening 44 provides access to both sides 34, 36 of the tape 32 for being accessed by a pair of read/write heads of the tape drive. FIG. 1 illustrates the tape cartridge 20 without a door for covering the access opening 44. The invention contemplates that the tape cartridge 20 may employ a door for covering the access opening 44 during transportation or storage of the tape cartridge 20. As is known in the art, the door 20 may be translatable relative to the access opening 44 for permitting access to the access opening 44 when the tape cartridge 20 is being utilized with a tape drive.

Figure 4:
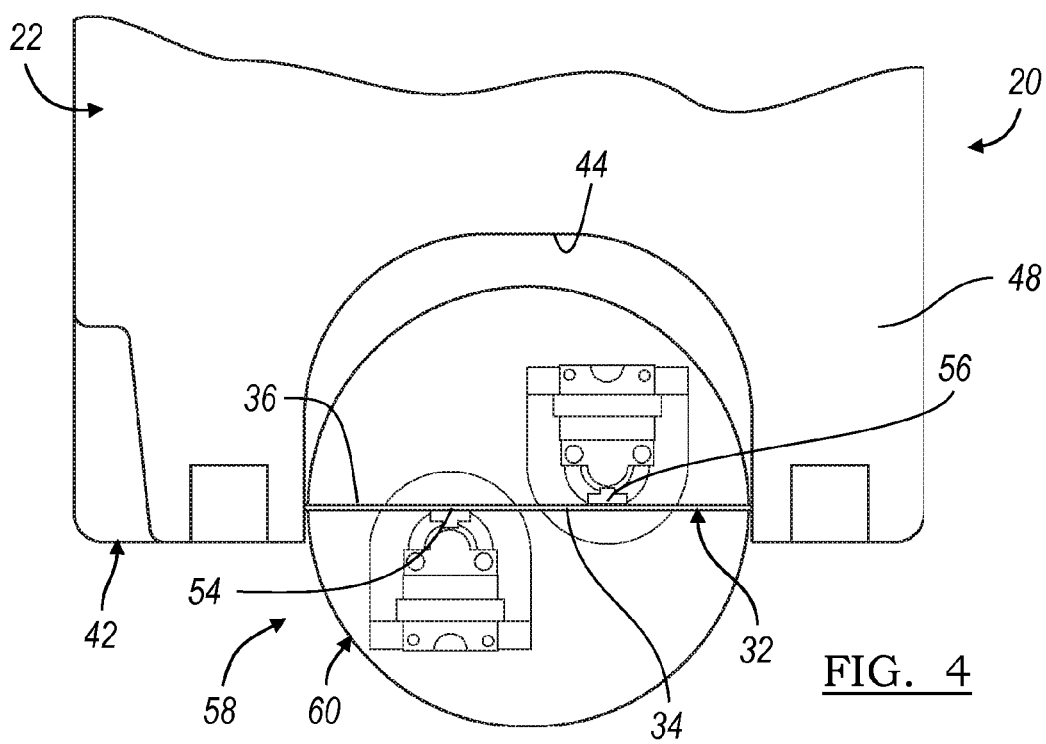
FIG. 4 is another top plan view of the tape cartridge of FIG. 1 and the portion of the tape drive of FIG. 3, illustrated in a fully loaded position.
Figure 5:
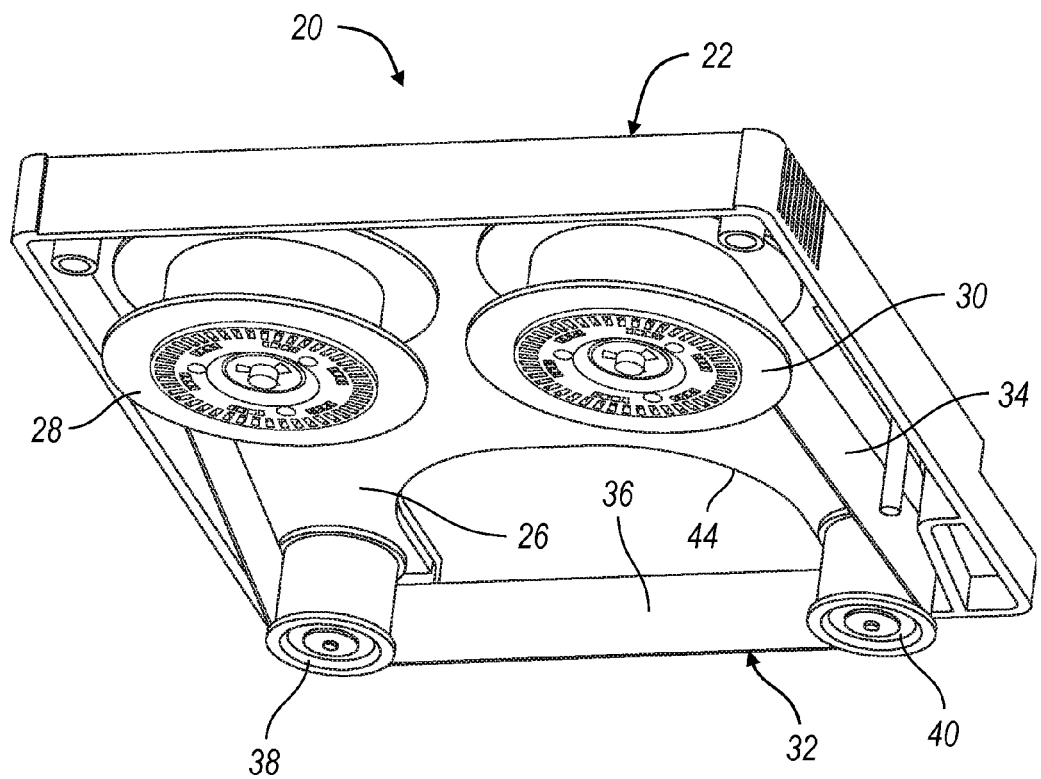
FIG. 5 is a bottom perspective view of the tape cartridge of FIG. 1, illustrated with a portion of the housing removed, in a preload position relative to a portion of the tape drive of FIG. 3.
Figure 5:
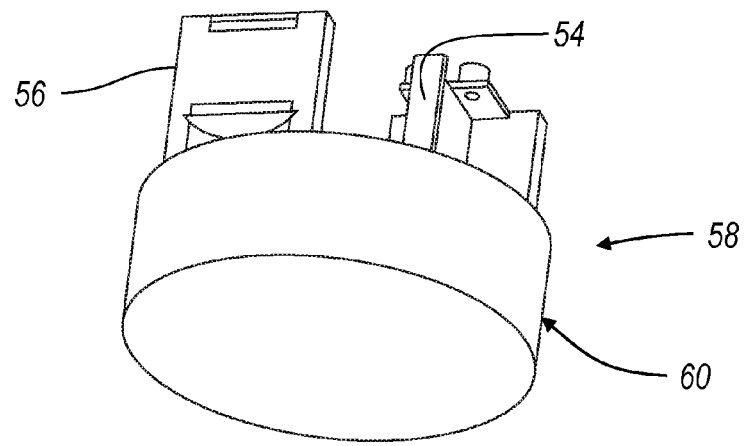

FIGS. 3-6 illustrate the cartridge 20 cooperating with a pair of read/write heads 54, 56 of a tape drive 58. In FIG. 5, the cartridge 20 is in a pre-load position, wherein the cartridge 20 is inserted into the drive 58 and the tape 32 is oriented above the read/write heads 54, 56; and the reels 28, 30 are oriented over associated reel motors (not shown). Subsequently, an elevator mechanism (not shown) of the tape drive 58 lowers the cartridge 20 such that the tape 32 at the peripheral region 42 of the cartridge 20 extends between the pair of read/write heads 54, 56. Elevators for tape drives are known in the art, such as that disclosed in U.S. Pat. No. 7,298,585, which issued on Nov. 20, 2007 to Willems Jr. et al., and is incorporated in its entirety by reference herein.

Figure 6:
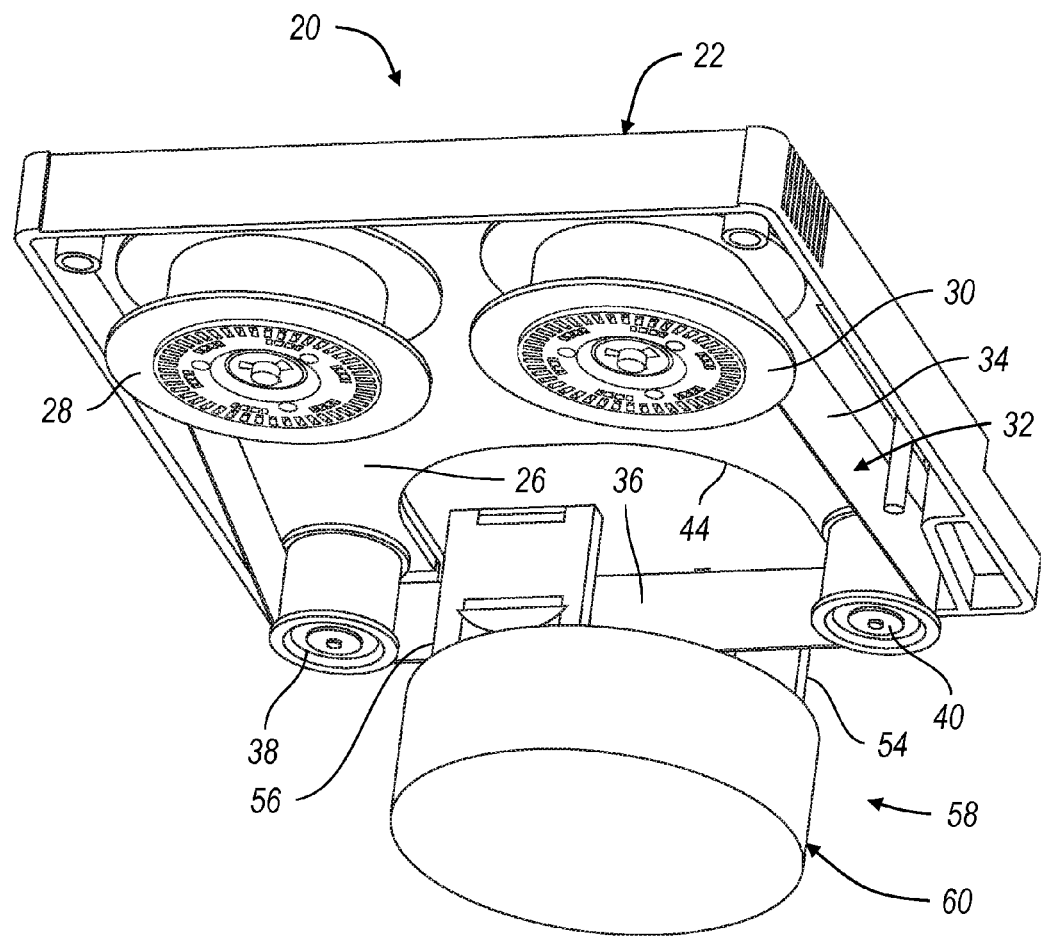
FIG. 6 is another bottom perspective view of the tape cartridge of FIG. 1, illustrated with a portion of the housing removed, and illustrated in a fully loaded position relative to a portion of the tape drive of FIG. 3.

The read/write heads 54, 56 are each mounted to a rotary actuator 60. Once the cartridge 20 is in the load position illustrated in FIG. 3, the rotary actuator 60 rotates the read/write 54, 56 to engage the tape 32 as illustrated in FIGS. 4 and 6. Each of the read/write heads 54, 56 engages one of the opposing sides 34, 36 of the tape 32 in the peripheral region 42 of the cassette 20 for individually or currently performing a read or write operation to the tape 32.

The tape heads 54, 56 are referred to as read/write heads because the tape heads may be utilized for performing a read function, a write function, or both. For example, the tape drive may be utilized for writing only and the tape heads 54, 56 may be write heads only. Alternatively, the tape heads 54, 56 may be utilized for reading operations only and therefore may be read tape heads only. Typically, the read/write heads 54, 56 are utilized for both reading data from the tape 32 and writing data to the tape 32 and therefore the tape heads 54, 56 may be read/write heads for performing either operation.

The read/write heads 54, 56 are spaced apart along the length of the tape 32 to prevent either tape head 54, 56 from interfering with the operation of the other. Yet, the tape heads 54, 56 are provided on a common peripheral region 42 of the cartridge 20 so that only one region of the cassette 20 is required for exposing the tape 32. This orientation of read/write tape heads 54, 56 may also be utilized for requiring only one access opening 44, in at least one embodiment of the invention.

Due to the proximity of the tape heads 54, 56 to the tape 32 during a loading of the cartridge 20, the loading is simplified relative to prior art tape drives. Therefore, load time is reduced. By reducing the length of the tape 32, data can be accessed in half the time or less compared to existing formats. By writing on both sides of the tape 32, twice as much data can be written on a given length of tape in comparison to single sided tape. For a given capacity requirement for a tape cartridge 20, the tape 32 can be half as long, thereby greatly reducing the time to data. Additionally, a shorter tape length, which occupies less of the diameter of the reels 28, 30 permits thicker tape to be used, which extends the life of the cartridge 20 and improves guiding of the tape 32.

Figure 7:
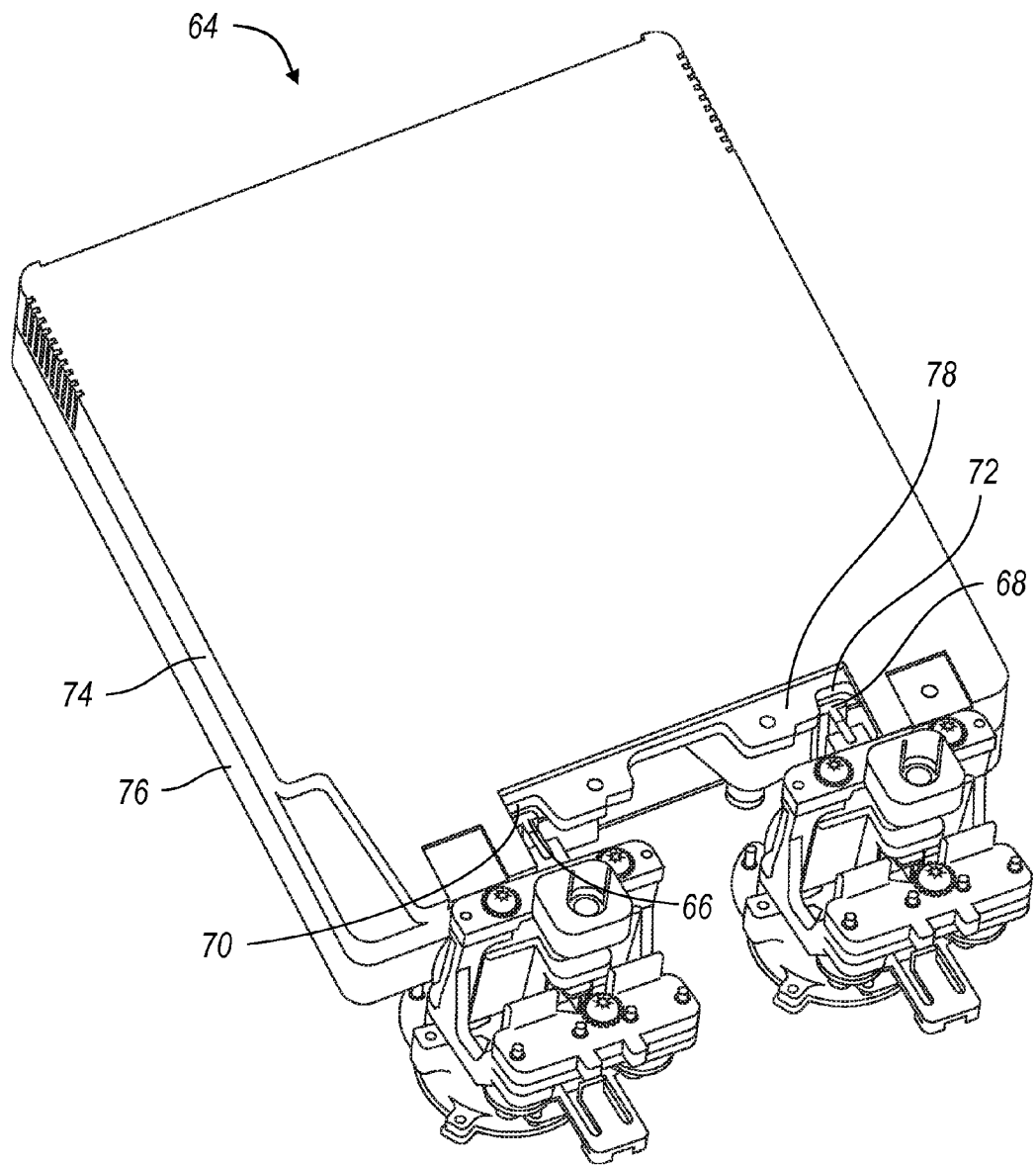
FIG. 7 is a top perspective view of a tape cartridge according to another embodiment of the present invention, illustrated in a loaded position with a portion of a tape drive according to yet another embodiment of the present invention.

FIG. 7 illustrates a tape cartridge 64 according to another embodiment of the present invention. The tape cartridge 64 is illustrated in a loaded position with a pair of read/write heads 66, 68 each extending into one of a pair of access openings 70, 72 for performing reading and/or writing operations to tape within the tape cartridge 64. The tape cartridge 64 is illustrated without a translatable door that is employed for covering the access openings 70, 72 when not in use. The tape cartridge 64 includes an upper housing portion 74 and a lower housing portion 76, which retain a substrate 78.

Figure 8:
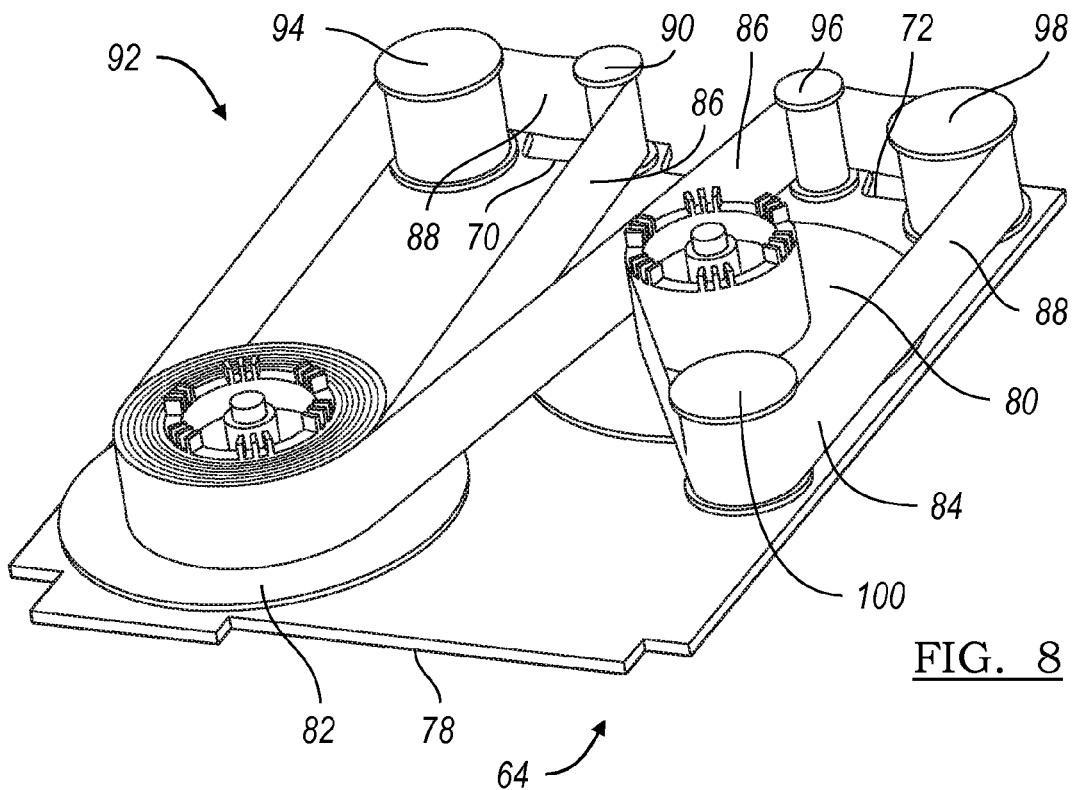
FIG. 8 is a top perspective view of a portion of the tape cartridge of FIG. 7.

Referring now to FIG. 8, a pair of tape reels, namely forward tape reel 80 and rearward tape reel 82 are mounted for rotation upon the substrate 78. The tape reels 80, 82 are illustrated with a top flange removed for revealing an associated data tape 84 and the path of the data tape 84. Similar to the prior embodiment, the data tape 84 is a dual sided data tape with magnetic coatings on both sides, a first side 86 and a second side 88. The tape 84 is illustrated primarily collected on the rearward tape reel 82.

The tape 84 extends from the rearward tape reel 82 to a first guide roller 90 that is mounted for rotation to the substrate 78, laterally offset from a center of a peripheral region 92 of the tape cartridge 64. The tape 84 extends from the first guide roller 90 across the first access opening 70 to a second guide roller 94, thereby exposing the first side 86 of the tape 84 to the access opening 70. The tape 84 then extends about the rearward tape reel 82, and in one embodiment, such as the embodiment depicted in FIG. 8, the tape 84 is guided about the spool of tape 84 upon the reel 82. Then, the tape 84 extends from the rearward tape reel 82 about the forward tape reel 80. In at least one embodiment, the forward tape reel 80 acts as a guide to the tape 84. The tape 84 extends about a third guide roller 96 that is also mounted to the substrate 78 offset from the center of the peripheral region 92. Then, the tape 84 extends across the second access opening 72 and about a fourth guide roller 98 thereby exposing the second tape side 88 to the access opening 72. From the fourth guide roller 98, the tape 84 extends about a fifth guide roller 100, and then to the forward tape reel 80.

The configuration of the path of the tape 84 exposes each side 70, 72 of the tape 84 to one of the access openings 70, 72. Although five guide rollers 90, 94, 96, 98, 100 are illustrated, the invention contemplates any number of guide rollers in order to present both sides 86, 88 of the dual sided tape 84 to an access opening or a pair of access openings 70, 72 of the cartridge 64. Although the guides are illustrated as rollers, the invention contemplates any suitable guide for directing the path of the tape 84 within the cartridge 64.

Figure 9:
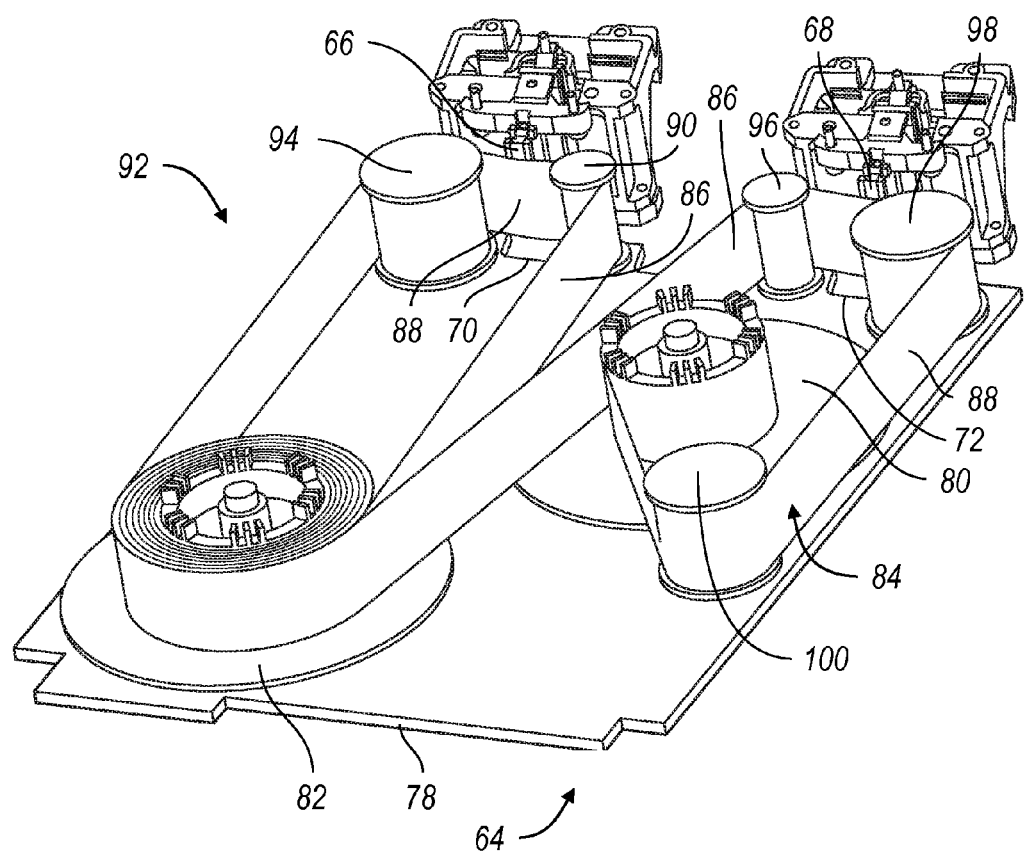
FIG. 9 is another top perspective view of the portion of the tape cartridge of FIG. 7, illustrated in cooperation with the portion of the tape drive of FIG. 7.

Referring now to FIG. 9, the pair of read/write heads 66, 68 are each illustrated extending into the corresponding access opening 70, 72 for engaging the exposed sides 86, 88 of the data tape 84.

Similar to the prior embodiment, twice as much data can be written on a length of tape by utilizing both sides 86, 88 of the tape 84, thereby reducing the time to data for a given capacity requirement. Alternatively, a full length data tape 84 for a given cartridge 64 can be doubled by providing magnetic data coatings on both sides 86, 88 of the tape 84.

Figure 10:
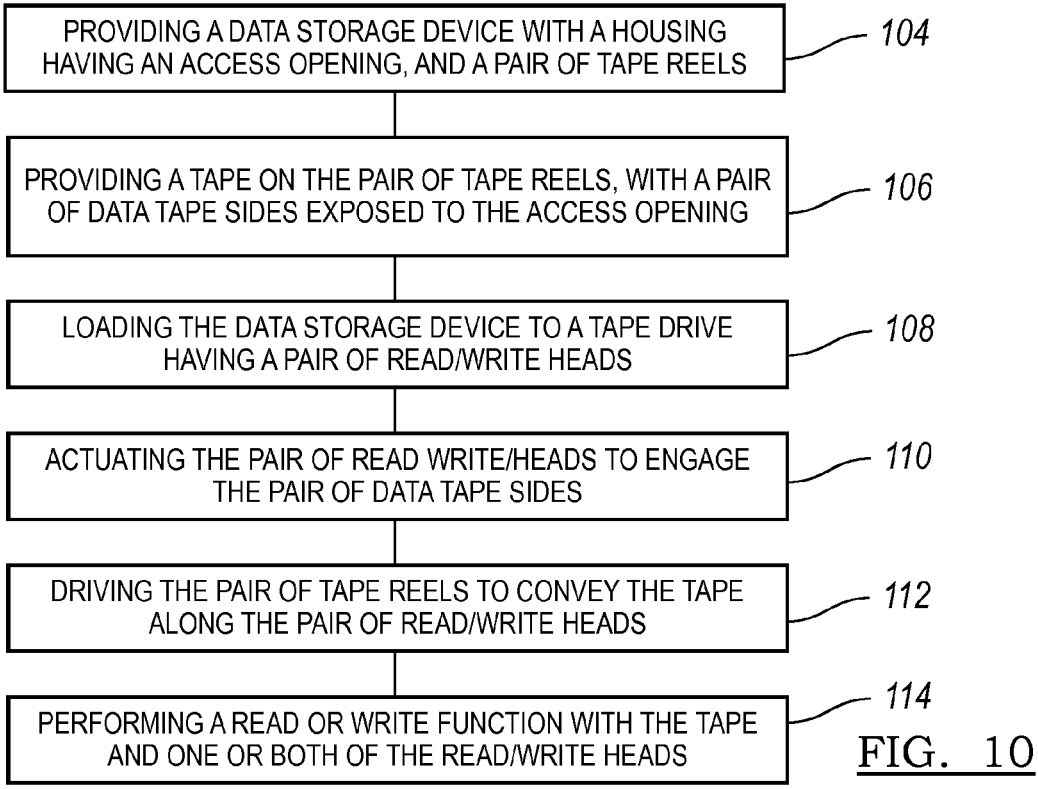
FIG. 10 is a flow chart of a method for reading and/or writing data with a data storage device according to yet another embodiment of the present invention.

FIG. 10 illustrates a flow chart for a method for reading and/or writing data with a data storage device according to at least one embodiment of the present invention. At block 104, a storage device is provided with a housing having an access opening a pair of tape reels. The method provides tape on the pair of tape reels with a pair of data tape sides exposed to the access opening in block 106. The data storage device is loaded to a tape drive having a pair of read/write heads at block 108. At block 110, the pair of read/write heads are actuated to engage the pair of data tape sides. At block 112, the pair of tape reels are driven to convey the tape along the pair of read/write heads. A read or write function is performed with the tape and one or both of the read/write heads at block 114.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage device comprising:
a housing defining a cartridge sized to cooperate with a tape drive;
a first tape reel mounted for rotation within the housing;
a second tape reel mounted for rotation within the housing; and
a data tape having a first end mounted to the first tape reel, a second end mounted to the second tape reel, a first data tape side and a second data tape side;
wherein an access opening is formed in the housing adjacent to a tape path of the tape for access to the first data tape side by a first read/write head of the tape drive, and for access to the second data tape side by a second read/write head of the tape drive; and
wherein the access opening is further defined as a first access opening adjacent to the tape path for access to the first data tape side, and a second access opening adjacent to the tape path for access to the second data tape side.

2. The data storage device of claim 1 wherein the tape path is oriented adjacent to a peripheral region of the cartridge, and the first and second access openings are formed through the peripheral region of the cartridge.

3. The data storage device of claim 2 wherein the housing has a top portion and a bottom portion and the first and second access openings are formed partially through at least one of the top portion and the bottom portion for access to an inward facing side of the tape.

4. The data storage device of claim 1 further comprising at least one guide mounted within the housing spaced apart from the tape reels and oriented adjacent to the first and second access openings, wherein the tape path extends about the guide for conveying the tape adjacent to the first and second access openings.

5. The data storage device of claim 1 wherein the first access opening is spaced apart from the second access opening.

6. The data storage device of claim 1 wherein the first access opening and the second access opening are both oriented on one peripheral side of the housing.

7. The data storage device of claim 1 further comprising a plurality of guides for directing the tape path such that the first data tape side and the second data tape side are exposed at the first and second access openings.

8. The data storage device of claim 1 further comprising:
a first guide adjacent to the first access opening;
a second guide adjacent to the first access opening;
a third guide adjacent to the second access opening; and
a fourth guide adjacent to the second access opening;
wherein the tape path from the first tape reel extends to the first guide, around the second guide thereby exposing the first data tape side to the first access opening, around the second tape reel, to the third guide, around the fourth guide thereby exposing the second data tape side to the second access opening, to the second tape reel.

9. A tape drive comprising a first read/write head and a second read/write head, the first and second read write heads having a first position to receive the tape of the data storage device of claim 1, and a second position for engaging the tape.

10. A tape drive comprising:
a first read/write head having a first position to receive a data storage device having dual sided data tape, and a second position for engaging one side of the dual sided tape for performing a read/write function; and
a second read/write head having a first position to receive the data storage device and a second position for engaging the other side of the tape for performing a read/write function individually or concurrently with the first read/write head;
wherein the first read/write head and the second read/write head are oriented facing a single peripheral region of the data storage device; and
wherein each of the first and second read/write heads are aligned to extend into one of a pair of access openings in the data storage device.

11. The tape drive of claim 10 further comprising at least one data storage device comprising:
a housing defining a cartridge sized to cooperate with the tape drive;
a first tape reel mounted for rotation within the housing;
a second tape reel mounted for rotation within the housing; and a data tape having a first end mounted to the first tape reel, a second end mounted to the second tape reel, a first data tape side and a second data tape side;

wherein a pair of access openings are formed in the housing adjacent to a tape path of the tape for access to the first data tape side by the first read/write head of the tape drive, and for access to the second data tape side by the second read/write head of the tape drive.

12. The tape drive of claim 10 wherein the first read/write head and the second read/write head are spaced apart along a tape path of the dual sided tape.

13. A method for reading and/or writing data with a data storage device comprising:

providing a data storage device with a housing having a pair of access openings, and a pair of tape reels in the housing;

providing a tape with a pair of ends that are each mounted to one of the pair of tape reels, and with a pair of data tape sides, such that the tape has a tape path that exposes each data tape side to one of the pair of access openings;

loading the data storage device to a tape drive according to claim 10;

actuating the pair of read write/heads to each engage one of the pair of data tape sides;

driving the pair of tape reels to convey the tape along the pair of read/write heads; and performing a read or write function with the tape and at least one of the pair of read/write heads.

14. A method for reading and/or writing data with a data storage device comprising:

providing a data storage device according to claim 1;

loading the data storage device to a tape drive having a pair of read/write heads;

actuating the pair of read write/heads to each engage one of the pair of data tape sides;

driving the pair of tape reels to convey the tape along the pair of read/write heads; and performing a read or write function with the tape and at least one of the pair of read/write heads.

15. The method of claim 14 further comprising concurrently performing a read or write function with the tape and both of the pair of read/write heads.

16. A data storage device comprising:

a housing defining a cartridge sized to cooperate with a tape drive;

a first tape reel mounted for rotation within the housing;

a second tape reel mounted for rotation within the housing;

a data tape having a first end mounted to the first tape reel, a second end mounted to the second tape reel, a first data tape side and a second data tape side;

wherein an access opening is formed in the housing adjacent to a tape path of the tape for access to the first data tape side by a first read/write head of the tape drive, and for access to the second data tape side by a second read/write head of the tape drive;

a first guide adjacent to the access opening;

a second guide adjacent to the access opening;

a third guide adjacent to the access opening; and a fourth guide adjacent to the access opening;

wherein the tape path from the first tape reel extends to the first guide, around the second guide thereby exposing the first data tape side to the access opening, around the second tape reel, to the third guide, around the fourth guide thereby exposing the second data tape side to the access opening, to the second tape reel.

17. The data storage device of claim 16 further comprising a fifth guide, wherein the tape path from the fourth guide extends around the fifth guide, then to the second tape reel.

18. The data storage device of claim 16 wherein the tape path from the second guide extends around the first tape reel, then around the second tape reel, then to the third guide.

19. A tape drive comprising a first read/write head and a second read/write head, the first and second read write heads having a first position to receive the tape of the data storage device of claim 16, and a second position for engaging the tape.

20. A method for reading and/or writing data with a data storage device comprising:

providing a data storage device according to claim 16;

loading the data storage device to a tape drive having a pair of read/write heads;

actuating the pair of read write/heads to each engage one of the pair of data tape sides;

driving the pair of tape reels to convey the tape along the pair of read/write heads; and performing a read or write function with the tape and at least one of the pair of read/write heads.

* * * * *